United States Patent [19]

Darvell et al.

[11] Patent Number: 4,855,170
[45] Date of Patent: Aug. 8, 1989

[54] PRESSURE-SENSITIVE TAPE CONSTRUCTION INCORPORATING RESILIENT POLYMERIC MICROSPHERES

[75] Inventors: Wayne K. Darvell, North St. Paul; Patricia R. Konsti, Oakdale, both of Minn.; Jurgen Klingen, Schwalmtal; Karl W. Kreckel, Haan, both of Fed. Rep. of Germany

[73] Assignee: Minnesota Mining and Manufacturing Company, St. Paul, Minn.

[21] Appl. No.: 85,239

[22] Filed: Aug. 13, 1987

Related U.S. Application Data

[63] Continuation-in-part of Ser. No. 898,941, Aug. 21, 1986, abandoned.

[51] Int. Cl.$^4$ .............................. B32B 5/16
[52] U.S. Cl. ................... 428/40; 428/144; 428/147; 428/327; 428/343; 428/354; 428/317.5
[58] Field of Search ............. 428/317.5, 147, 343, 428/40, 354, 327, 144

[56] References Cited

U.S. PATENT DOCUMENTS

| | | | |
|---|---|---|---|
| 3,314,838 | 4/1967 | Erwin | 156/71 |
| 3,439,950 | 4/1969 | Kunevicius | 293/1 |
| 3,565,247 | 2/1971 | Brochman | 206/59 |
| 3,615,972 | 10/1971 | Morehouse et al. | 156/79 |
| 3,691,140 | 9/1972 | Silver | 260/78.5 |
| 3,857,731 | 12/1974 | Merrill et al. | 117/122 |
| 3,864,181 | 2/1975 | Wolinski et al. | 156/79 |
| 4,005,033 | 1/1977 | Georgeau et al. | 260/2.5 |
| 4,049,483 | 9/1977 | Loder et al. | 156/230 |
| 4,075,138 | 2/1978 | Garner | 260/2.5 |
| 4,145,465 | 3/1979 | Sanderson et al. | 428/31 |
| 4,166,152 | 8/1979 | Baker et al. | 428/522 |
| 4,223,067 | 9/1980 | Levens | 428/308 |
| 4,287,308 | 9/1981 | Nakayama | 521/53 |
| 4,376,151 | 3/1983 | Parrotts | 428/323 |
| 4,388,424 | 6/1983 | Kennell et al. | 523/219 |
| 4,415,615 | 11/1983 | Esmay et al. | 428/40 |
| 4,587,152 | 5/1986 | Gleichenhagen | 429/195 |
| 4,735,837 | 5/1988 | Miyasaka | 428/317.5 |

FOREIGN PATENT DOCUMENTS

| | | |
|---|---|---|
| 0070524 | 1/1983 | European Pat. Off. |
| 1594060 | 12/1965 | Fed. Rep. of Germany |
| 56-61467 | 5/1981 | Japan |
| 56-61468 | 5/1981 | Japan |
| 56-61469 | 5/1981 | Japan |

*Primary Examiner*—Alexander S. Thomas
*Attorney, Agent, or Firm*—Donald M. Sell; Walter N. Kirn; Richard E. Brink

[57] ABSTRACT

Tape products for diverse end users are obtained by applying to a sheet backing a layer of normally tacky and pressure-sensitive adhesive (PSA) containing and completely surrounding resilient non-tacky hollow thermoplastic polymeric microspheres. When the PSA is permanently bonded to the backing and the exposed surface has an irregular contour, a removable and repositionable product results. When the PSA forms a continuous matrix that is strippably bonded to the backing and is 1 mm or more thick, the resultant product is a foamlike transfer tape or foam tape. Depending on the product, the PSA can contain from about 1/5 to about 2/3% of the microspheres by volume.

24 Claims, No Drawings

PRESSURE-SENSITIVE TAPE CONSTRUCTION INCORPORATING RESILIENT POLYMERIC MICROSPHERES

CROSS-REFERENCE TO RELATED CASES

This application is a continuation-in-part application Ser. No. 898,941, filed Aug. 21, 1986 abandoned.

BACKGROUND OF THE INVENTION

This invention relates to pressure-sensitive adhesive tapes, especially tapes which contain voids, and more particularly to tapes in which the voids are provided by incorporating hollow microspheroids. The desirability of a tape construction capable of conforming to irregular surfaces has long been recognized, one way of achieving this physical characteristic being illustrated in U.S. Pat. Nos. 3,439,950 and 4,145,465, each of which shows a foamed conformable backing coated on at least one face with a conventional pressure-sensitive adhesive (PSA). U.S. Pat. No. 3,565,247 teaches that the PSA itself may be foamed to impart conformability, U.S. Pat. No. 4,415,615 pointing out that filling the voids in the foamed adhesive with gas reduces permanent compression when the adhesive is subjected to pressure. U.S. Pat. No. 4,223,067 shows that hollow glass microspheres can be incorporated to create a foam-like appearance.

U.S. Pat. No. 3,314,838 shows the incorporation of fragile glass microbubbles at the upper surface of a PSA tape; the bubbles, which are covered with a thin coating of PSA, provide reduced adhesion and permit repositioning until the desired location is achieved, at which time the application of force crushes the bubbles and permits the main body of the adhesive to contact the surface being adhered to. Canadian Pat. No. 1,174,124, German Pat. No. 1,594,060 and U.S. Pat. No. 4,376,151 describe the incorporation of non-adhesive particles at the surface of a PSA to reduce adhesion, the particles migrating into the adhesive when sufficient pressure is applied and thereby increasing the adhesive bond.

Japanese Pat. Pubs. No. 56-61468 and 56-61469 teach the incorporation of expanded or expandable polymeric microbubbles in a pressure-sensitive adhesive. In one construction, the expanded microbubbles cover the surface of the PSA, preventing adhesion until such time as sufficient heat is applied to collapse the bubbles and expose the PSA. In the other construction, expandable microspheres are included in the pressure-sensitive adhesive, the application of heat expanding the microbubbles and destroying the bond of the PSA to a substrate to which it had been applied previously. In each case, it appears that the patentees incorporate a sufficient quantity of microspheres to constitute perhaps 90% of the total volume of the adhesive layer when the spheres are expanded, thereby effectively destroying any adhesive properties. Suitable bubbles for the patentees' purposes are taught in U.S. Pat. Nos. 3,615,972 and 4,287,308. U.S. Pat. No. 4,388,424 discloses caulk or sealant containing glass microballoons, U.S. Pat. Nos. 4,005,033 and 4,075,138 both teaching the incorporation of polymeric microspheres in the same products. Japanese Pat. Pub. No. 56-61467 suggests including unexpanded plastic bubbles in adhesives (including PSAs), interposing the adhesive between two objects to be bonded and applying heat to expand the bubbles and fill gaps between the objects. U.S. Pat. No. 3,864,161 describes the incorporation of 0.25 to 40% by weight unexpanded hollow polymeric microspheres in a solution of a film-forming coating of adhesive polymer, coating the composition on a substrate, drying, and heating to expand the microspheres and form foam-like products (either open or closed cell) that are suggested for decorative coatings, padding, and gaskets.

U.S. Pat. Nos. 3,691,140 and 4,166,152 describe inherently tacky microspheres, which in U.S. Pat. Nos. 4,049,483 and 3,857,731 are used in conjunction with other adhesives, allowing the microspheres to protrude above the surface and thereby provide an adhesion level lower than if the adhesive surface were uniform and smooth; products in which inherently tacky microspheres are bonded to a paper backing are sold by Minnesota Mining and Manufacturing Company as "POST-IT" Brand notes, which can be repeatedly applied to paper, removed, and replaced without delaminating the paper. U.S. Pat. No. 4,588,152 discloses the use of small spaced pressure-sensitive adhesive areas which are said to provide a repositionable tape product.

Alternative approaches to the development of a removable and repositionable pressure-sensitive sheet of this type have included modifying conventional pressure-sensitive adhesives (PSAs) by lowering the initial adhesion and attempting to minimize the subsequent adhesion buildup which occurs as the adhesive remains in contact with the substrate, employing firmer adhesives, minimizing cold flow, and decreasing the total surface area coated with adhesive. Although successful to some extent, each of these techniques is limited in its ability to provide a balance of properties, i.e., sufficient adhesion to ensure attachment while minimizing the ultimate adhesion buildup so as to permit removal. The present invention provides a means of achieving all the advantages of prior art while avoiding the disadvantages. Conventional PSAs can be employed, while avoiding any adhesive transfer, maintaining removability over extended periods, and retaining excellent shear properties.

Another widely used commercial product is so-called "foam tape", in which a foam backing is provided on each face with a coating of PSA. For foam-like tapes, photopolymerizable or thermally polymerizable monomer systems are particularly preferred. These systems preferably comprise one or more monomers that are predominantly alkyl acrylate, the alkyl groups of which have an average of 4 to 12 carbon atoms, and a minor proportion of one or more polar co-polymerizable monomers such as disclosed in U.S. Pat. No. 2,884,126. Tapes of this type are, for example, especially effective in mounting resilient molding to the sides of automobiles to prevent inadvertent damage to the finish. In some cases, the foam backing is replaced with an adhesive that contains glass microbubbles to create a pseudo-foam effect while simultaneously retaining the adhesive properties of the PSA. The latter construction can be modified by laminating an unfoamed PSA to one or both faces. While effective is most circumstances, products of all these types are sensitive to shock at extremely low temperatures.

BRIEF SUMMARY

The present invention provides an improved family of pressure-sensitive adhesive tape products, including repositionable adhesive-coated sheets, transfer tapes having the same or different adhesive characteristics on opposite faces, compressible tape products resistant to shock at extremely cold temperatures, as well as a wide variety of other products. Tape constructions made in accordance with the invention may be tailored to control adhesion, conformability, and certain other properties as well as to improve static shear, internal strength, tensile strength, shock resistance and humidity resistance.

Diverse products of the types just described may be characterized as pressure-sensitive adhesive-coated sheet material comprising in combination a sheet backing bearing on at least one surface a layer of normally tacky and pressure-sensitive adhesive on the order of at least 20 micrometers thick, this adhesive layer containing up to about ⅔ by volume of resilient non-tacky hollow thermoplastic polymeric spheres, especially vinylidene chloride:acrylonitrile copolymer spheres, having a diameter in the approximate range of 10–125 micrometers, preferably at least about ⅔ of the spheres having a diameter in the range of 30–70 micrometers. All of the copolymer spheres are substantially completely surrounded by the pressure-sensitive adhesive and thus always present an adhesive surface, distinguishing the products of the invention from those described in the aforementioned Japanese Pat. Pubs. No. 56-61467, 56-61468, 56-61469.

When the adhesive layer is permanently bonded to the backing and the exposed surface of the adhesive layer has an irregular contour caused by the presence of the hollow polymeric spheres, the resultant sheet material can be repeatedly adhered to paper substrates and removed without tearing the paper. Such products are capable of substantially complete recovery after being subjected to a compressive pressure of 80 kPa. On the other hand, when the adhesive layer forms a continuous matrix that is strippably bonded to the backing and is on the order of one millimeter thick, the resultant foamlike transfer tape is suited, e.g., for mounting molding strips on automobiles, dispensers on walls, mirrors on vertical surfaces, and flexographic printing plates on steel cylinders.

In principle, the specific type of pressure-sensitive adhesive employed in carrying out the invention is not critical. Thus, the adhesive can be of the rubber-resin type, the "rubber" being natural or synthetic rubber, including block copolymers. It is sometimes preferred, however, to employ the so-called "acrylate" adhesives, which not only are less prone to discoloration than the rubber-resin types but also are capable of rather precise control during preparation; see, e.g., U.S. Pat. No. 2,884,126.

The hollow polymeric spheres employed are typically of the type disclosed in U.S. Pat. No. 3,615,972, which describes various vinyl polymers containing a hydrocarbon liquid that volatilizes at a temperature slightly below the softening point of the polymeric spheres. Thus, a sphere that is originally on the order of 10 micrometers in diameter, when heated to a temperature of, e.g., 120° C., is expanded to an average diameter of e.g., 30–60 micrometers. It is possible to include the unexpanded microspheres in the PSA and substantially heat them to effect expansion, but it is generally preferred to mix the expanded microspheres directly into the adhesive, a process which makes it easier to ensure that the hollow microspheres in the final adhesive are substantially completely surrounded by at least a thin layer of PSA.

The polymeric microspheres mentioned can be added to an adhesive system after the adhesive matrix has been polymerized; it is also possible and sometimes desirable, however, to add them to an adhesive monomer system prior to polymerization. The latter procedure is especially preferred for making a foam-like tape.

As previously indicated, hollow elastomeric, resilient polymeric microspheres are used in the practice of this invention. Such microspheres and their methods of preparation are described in U.S. Pat. Nos. 3,615,972, 4,075,138, and 4,287,308. The microspheres are available from the Pierce & Stevens Company under the trade name "Microlite" in unexpanded form and "Miralite" in expanded form. Similar microspheres are available from Kema Nord Plastics under the trade name "Expancel", from Matsomoto Yushi Seiyaku under the trade name "Micropearl", and formerly from Dow Chemical Company under the trade name "Saran". In expanded form the microspheres have a specific density of approximately 0.01–0.04 g/cm, typically 0.02–0.036 g/cc. Perhaps because of the thin, flexible shells of such microspheres (on the order of 0.02 micrometer according to trade literature), their rough surface, or their organic nature, they appear to be mechanically and/or chemically bonded to PSAs in which they are incorporated, becoming almost an integral part of the adhesive mass, distorting when the mass is subjected to pressures, distributing stress, absorbing energy, and exhibiting distinctly different characteristics from otherwise identical adhesive compositions incorporating only hollow glass or other rigid microspheres.

Addition of polymeric microspheres to an adhesive system prior to polymerization seems to enhance this behavior, the resultant tape (such as a foam-like tape) having a unique combination of superior low temperature performance and such desirable mechanical properties as superior compression recovery, high peel strength, improved static shear, and high tensile strength.

Fundamental methods of dynamic mechanical analysis (DMA), particularly when utilized in concert with more common techniques for analysis (e.g., ASTM tests), offer great potential to enhance understanding of structure/property relationships for adhesive systems. Dynamic mechanical analyses characterize the response of an adhesive to an applied stress as a function of either frquency or temperature (with the remaining parameter fixed). Response to stress is quantified in terms of a storage modulus (G') and a loss modulus (G"). The correlation of these two moduli is fundametnal for characterization of a PSA system, and is increasingly instrumental in the design of new generation adhesives.

It has been established that incorporation of voids such as gas bubbles or rigid (e.g., glass) microspheres in an adhesive matrix modifies the morphological and rheological characteristics of the system in generally predictable ways.

In contrast, results of dynamic mechanical analyses and the more commonly applied physical and mechanical property tests, correlate well to demonstrate that incorporation of resilient polymeric microspheres modifies both surface and bulk properties of the adhesive in ways not previously predicted, observed or utilized. DMA results indicate that the flexible polymeric bubbles impart a means for energy and/or stress dissipation not present in unfilled systems, or in systems containing either gas-filled voids or hollow glass microspheres. Consistent with these results, established physical and mechanical property tests demonstrate that the plastic bubble-filled adhesive tapes of the present invention exhibit an outstanding balance of properties with regard to low temperature shock performance, internal strength, conformability and recoverable compressibility. This range of performance is greatly superior to any previously known PSA tape construction.

The novel behavior apparently arises from the union of the appropriate polymer matrix intimately incorporating thin-walled flexible microbubbles that are responsive to deformation resulting from stress(es) imposed on the polymer matrix. The overall surface and bulk properties of the composite will depend on the concentration and distribution of the microbubbles (i.e., homogeneous or asymmetric, such as increased concentration near the adhesive surface).

The present invention thus provides a means for tailor-making a family of adhesive constructions that exhibit specified initial adhesion, controlled adhesion build, shear strength, recoverable compressibility and if desired, differential adhesion.

The bulk adhesive viscoelastic properties, as measured by dynamic mechanical thermal analysis (DMTA), as detailed in ASTM Test Procedure D4065-2, demonstrate that the addition of resilient polymeric particles to the adhesive results in a more elastic material over the temperature range of 0°–120° C. For example, at room temperature (25° C.), the shear storage modulus, G', at 10 Hz for the base adhesive (IOA:AA) is $9.3 \times 10^5$ dynes/cm$^2$, which is a typical value for a PSA. The corresponding modulus for the same adhesive with the addition of 6.8 phr polymeric spheres is $1.3 \times 10^7$ dynes/cm$^2$, representing a more elastic material.

The adhesive/particle composites resist cold flow (and the resultant increase in adhesion) that normally occurs gradually when an adhesive remains in contact with a substrate for extended periods. The exact effect achieved varies with the type of adhesive and the polymeric microsphere content.

Dynamic mechanical analysis (DMA) may be used to simulate the creep/recovery cycle that an adhesive will experience in actual use. A refined description of DMA techniques especially suited for use with PSAs appears in "Evaluation of the Role of Microphase Separation in Adhesion," the doctoral dissertation of Margaret M. Sheridan, submitted to Virginia Polytechnic Institute and State University, Blacksburg, Va., in August, 1985. When tested in accordance with DMA procedures, homogeneous PSAs are characterized by a high degree of compliance but a low degree of recovery. When such PSAs are modified by incorporating polymeric microspheres, however, not only is compliance increased (as is evidenced by increased penetration or compressive creep while the force is applied), but there is also a substantially greater recovery to the original dimensions after the compressive force is removed. In general, the degree of penetration is directly related to the volume concentration of the hollow polymeric spheres until the concentration approaches close pack volume. In actual use, the initial bond formation of a PSA is directly related to the extent of penetration determined by DMA techniques.

In contrast to the effect achieved by incorporating hollow polymeric microspheres in a homogeneous PSA, the incorporation of rigid particles (e.g., glass microbubbles) decreases both compliance and recovery.

The modified properties of the adhesive composite appear to be due to a combination of the changed bulk adhesive viscoelastic properties and the altered topological effects that result from the addition of the polymeric spheres. Peel adhesion, shear, and other properties of the selected base polymer can be controllably altered by varying the volume percentage of particles. For example, in a foam-like adhesive tape such as that used for permanent mounting of molding strips on automobiles, the volume loading of polymeric microspheres in the adhesive matrix is preferably from 1/5 to ½, more preferably 3/10 to 2/5, and the microspheres are preferably added to the monomer system prior to polymerization in order to achieve the unique combination of properties previously mentioned. At a volume loading of less than 1/5, the tape properties are similar to those of the parent polymer matrix, and so the desired properties are not optimized. On the other hand, a volume loading of greater than ½ results in diminished tensile strength, internal strength and 90° peel adhesion.

Adhesives made in accordance with the invention may, of course, also include conventional additives such as dyes, pigments, fumed silica, chopped fibers, hollow glass microspheres, fillers, catalysts, crosslinking agents, and the like to achieve specific effects. Similarly, separately formed microbubble-free PSA layers can be laminated to one or both surfaces of a PSA layer containing polymeric microbubbles.

Several tests have been found helpful in evaluating the performance of tapes made in accordance with the invention. Details of these tests are provided below:

90° Peel Adhesion

A strip of 25-micrometer polyester film, 31.75 mm wide, is positioned on the adhesive side of the sample. Pressure is applied to the polyester strip by rolling it twice with a 2-kg roller. The opposite face of the sample is then firmly bonded to a rigid substrate and the polyester strip removed at 90° to the adhesive surface at a speed of 30.5 cm/minute, noting the average adhesion in g/cm width.

By incorporating varying amounts of hollow polymeric microspheres into a pressure-sensitive adhesive, one can obtain peel adhesion values ranging from that obtainable with microsphere-free adhesive to zero, by increments proportional to the volume of spheres added.

180° Peel Adhesion

A stainless steel (AISI 302 or 304) test panel at least 50×125 mm, is obtained and the 25 mm immediately joining the lower edge covered with masking tape. Two 100 mm strips of adhesive transfer tape or adhesive foam tape, carried on a removable liner, are adhered, side by side, to the exposed portion of the stainless steel panel. The liner is then removed and a 300 mm strip of 25 mm wide×25 micrometer thick polyester film is placed in contact with the exposed adhesive so as to extend beyond the transfer tape on the edge covered with the masking tape. The tape is rolled down using a 2-kg roller at the rate of 300 mm/minute, once in each direction, and the sample allowed to dwell for 20 minutes. The polyester is then doubled back on itself and the masking tape-covered edge of the panel is clamped in the lower jaw of a tensile tester, the polyester doubled back on itself and clamped in the upper jaw of the tensile tester, and the jaws separated at a rate of 300 mm/minute, noting the average adhesion value. Further details of this test are set forth in "Test Methods for Pressure-Sensitive Tapes", Pressure-Sensitive Tape Council, Glenview, IL, 9th Edition, as PSTC-3.

Breakaway/Continuous Peel

A 12.7 mm×200 mm adhesive foam tape, carried on a release liner, is aligned squarely over the 15 mm×150 mm face of a rigid poly(vinyl chloride) test bar about 6 mm thick and pressed firmly into place by rolling once with a 6.8-kg roller. The liner is then removed from the tape and the exposed adhesive surface aligned in the center of a freshly painted steel panel approximately 100 mm×300 mm, with one end of the test bar extending beyond the end of the panels, rolling the test bar with the 6.8-kg roller at the rate of about 300 mm/minute to ensure good contact. The specimen is then allowed to age for any desired period of time, after which a metal shear is used to trim the width of the panel to approximately 50 mm. The specimen is then clamped in a horizontal fixture mounted in the lower jaw of a tensile testing machine. A metal bar approximately 8 mm thick and having an opening at one end corresponding to the cross section of the vinyl test bar is slipped over the extended end of the test bar and the opposite end gripped in the upper jaw of the tensile testing machine. The jaws are then separated at 30.5 cm/minute, noting both the force required to initiate separation of the vinyl test bar from the painted panel and the force required to continue the separation until the bar is completely removed.

Cold Slam

A rigid vertical frame approximately 40 cm square is provided at its upper edge with similarly dimensioned hinged frame. Silicone foam shock absorbing tape is then mounted at five locations on the vertical frame. A 100 mm×300 mm steel test panel on which four 15 mm vinyl test bars (of the type described in the preceding test) are mounted within the hinged frame and allowed to remain 72 hours at room temperature. The assembly is then placed in a −30° C. cold room for 16 hours and immediately subjected to a test in which the hinged portion of the frame is raised to a horizontal position and allowed to drop, slamming against the vertical portion, noting whether any of the vinyl test bars become detached. After 10 slams, the test is deemed completed and the number of failures is reported.

Static Shear Test

A strip of 12.7 mm wide transfer tape or double-coated tape, carried on a strippable liner, is adhered to one end of a stainless steel test panel and trimmed to a length of 25.4 mm. The liner is then removed and a second stainless steel panel adhered to the exposed adhesive surface. The specimen is placed in a horizontal position and a 1-kg weight applied for a period of 15 minutes to ensure intimate contact between the surfaces. The assembly is then mounted in a vertical plane, suspended from the upper edge of one panel and a weight of the desired size attached to the lower edge of the other panel. The time before the panel to which the weight is attached falls is noted. If no failure occurs, the test is discontinued after 10,000 minutes. Further details of this test may be found in the aforementioned "Test Methods for Pressure-Sensitive Tapes", as PSTC-7.

Tensile Elongation

A dumbbell-shaped strip of a tape to be tested is prepared, and each end wrapped with 42-mm wide cellophane tape, leaving a 50mm33 6.4-mm strip of the test tape exposed. The cellophane-covered ends of the test specimen are then clamped in the opposite jaws of a tensile machine, and the jaws separated at a rate of 500 mm/minute, recording the elongation at break and calculating the tensile strength, based on the thickness of the test tape.

T-Peel

A foam tape or other double-coated tape sample is placed between two strips of 25 mm×200 mm×0.125 mm anodized aluminum, leaving an adhesive-free 25 mm tab at each end of each aluminum strip. The assembly is rolled down with a 6.8 kg roller, one pass in each direction, and the samples then conditioned for 1-2 hours at room temperature. The tabs are bent back at 90° in opposite directions and respectively clamped in the upper and lower jaws of a tensile testing machine, after which the jaws are separated at 30 mm/minute, noting the average force required to effect separation.

Performance Aging

Adhesive sample strips, 2.54 cm wide, are applied to a bleached white xerographic paper weighing 78 g/m² and secured by rolling four times with a 2-kg roller. The sample strip is then removed at 90° to the paper surface, at a rate of 30.5 cm/minute, noting the initial average adhesion in g/cm width.

A duplicate adhesive sample, attached to the same bond paper, is aged at 50° C. for 14 days. After the laminate has adjusted to room temperature, the sample strip is removed, as above. The adhesion is noted and the sample is inspected for delamination and adhesive residue. The force to separate the adhesive-coated substrate from a bond paper, after 14 days aging, is used as a criterion to select optimum formulations. Generally, such formulations yield adhesive samples having enough surface roughness that appreciably less than 100% contact is maintained with the paper surface. Scanning electron micrographs of the peel interface have shown that "stranding" of the adhesive occurs in a manner similar to that which takes place with the microsphere adhesive of "POST-IT" Brand Notes, perhaps contributing to the uniformity of the force required to peel the adhesive continuously away from a substrate.

It is evident that the internal mechanical properties of the adhesive are altered by the inclusion of the polymeric particles. Throughout the temperature range of 0°–120° C., the elastic modulus of a PSA is greater when hollow polymeric microspheres are incorporated than when they are not, the increase being directly related to the concentration of microspheres. The cold flow decreases, retarding the increase in adhesion that normally occurs gradually when an adhesive remains in contact with a substrate for extended periods.

Although the peel adhesion of a homogeneous PSA can be substantially reduced by incorporating hollow polymeric microspheres, the shear holding power is only slightly reduced. To illustrate, while the peel adhesion of a given adhesive is reduced from 190 g/cm to 15.75 g/cm, the shear values are reduced from 3.31 kPa only to 2.34 kPa. As a reference, "POST-IT" Brand Notes typically have a peel adhesion of 28 g/cm and a shear value of 0.76 kPa. Improved shear holding power appears to be due in part, to the enhanced conformability of a PSA incorporating polymeric microspheres as evidenced by dynamic mechanical analysis. Thick composite PSA layers, having a continuous adhesive matrix, not only maintain desirable high peel adhesion values but also demonstrate enhanced conformability and shear holding power.

Dynamic Shear

A 2.54 cm×2.54 cm adhesive sample is attached to a clean stainless steel test panel and pressure applied by rolling 4 times with a 2-kg roller. A shear force is applied at 0° to the surface of the sample at a rate of 1.27 cm/minute, noting the maximum force to rupture the adhesive bond, expressed in N/cm².

The invention will now be described with the aid of illustrative but nonlimitative examples, in which all parts and percentages are by weight unless otherwise noted.

EXAMPLE 1

100 parts of a 55% solids aqueous emulsion of a proprietary modified isooctyl-acrylate: acrylic acid copolymer, of the type disclosed in Ulrich U.S. Pat. No. Re. 24,906, was blended with 8 parts of "Miralite 177" expanded vinylidene chloride:acrylonitrile copolymer microspheres having an average diameter of approximately 40 micrometers. The blend was knife-coated at a thickness of 50 micrometers onto the surface of a 40-micrometer cellulose acetate film and dried in a circulating air oven at 100° C., leaving an adhesive containing 63% microspheres by volume. As the water evaporated during the drying process, the adhesive tended to drain down, leaving an irregular surface occupied by the microspheres, a thin layer of adhesive continuing to cover the microspheres, however, in all cases. When the resultant adhesive-coated film was applied to bond paper and a squeegee used to ensure uniform contact, the film could be removed without delaminating the paper. A second adhesive was made in the same way except that 100 parts of the acrylate adhesive emulsion was blended with 50 parts of the "Miralite 177" microspheres; after drying, the adhesive coating contained only 30% microspheres by volume. When this composite adhesive was coated on cellulose acetate film and applied to bond paper, the resultant tape-like product could not be removed without delaminating the paper, apparently because there was sufficient space between the microspheres to permit a substantial area of the flat adhesive surface to come into intimate contact with the bond paper.

EXAMPLE 2

100 parts of the acrylate emulsion adhesive of Example 1 was blended with 4.4 parts of "Miralite" 177 polymeric microspheres. The composition was then knife-coated at a 76-micrometer orifice onto bond paper weighing 75 g/m² and having a thickness of 100 micrometers. The adhesive-coated paper was dried at 100° C., the resultant adhesive containing 67% hollow microspheres by volume, after which it was found to be removable from the bond paper substrate, exhibiting a peel adhesion of 18.9 g/cm width. Sheets were cut from the adhesive-coated paper and manually stacked to form a pad of notes, which was then trimmed to size with a guillotine knife. After one year of aging, individual sheets were removed from the pad and found to exhibit an adhesion to polyester film of 25.2 g/cm width. Adhesive-coated sheets prepared in the same way, except that no microspheres were included in the adhesive, would ordinarily be expected to exhibit a peel adhesion of approximately 250 g/cm width.

EXAMPLE 3

100 parts of a 42% solids aqueous emulsion of 95:5 isooctyl acrylate:acrylic acid copolymer was blended with 4.5 parts of a 50% solids aqueous slurry of "Microlite" 101 unexpanded polymeric microspheres, using a high speed blender to obtain a uniform dispersion. The dispersion was allowed to stand for 24 hours to permit entrapped air to escape, and the spheres were then resuspended by simple stirring. Using a knife coater having a 76-micrometer orifice, the dispersion was coated on 76-micrometer polyester film that had first been primed with a polycarbodiimide. The adhesive-coated film was then dried in a conventional air circulating oven for 3 minutes at 100° C., a temperature adequate to expand the microspheres from their initial average diameter of approximately 10 micrometers to approximately 40 micrometers and yield an adhesive containing 60% hollow microspheres by volume. It has been found highly desirable to permit the adhesive to dry partially but not completely, leaving a somewhat "skinned over" surface, before expanding the microspheres. If the adhesive is permitted to dry completely, expansion of the microspheres can result in a greater number protruding above the adhesive matrix, having no adhesive covering. For purposes of the present invention, it is essential that substantially all of the expanded microspheres be completely surrounded by adhesive.

The product of this Example 3 was allowed to adjust to room temperature, after which the initial peel adhesion to polyester film was measured and found to be 40 g/cm width. Peel adhesion for the same adhesive, but containing no microspheres, was approximately 190 g/cm width. When the product of this example was applied to bond paper, the force required to remove it after 14 days was 43 g/cm width.

Although one contemplated use for adhesives like that of the present example is in the preparation of removable tape products functionally equivalent to 3M's "POST-IT" Brand notes, which are frequently applied to paper substrates, it has been found that measurements of adhesion to paper are somewhat erratic, paper itself not being a consistent product. Accordingly, more precise peel adhesion figures may be obtained by applying the adhesive to a polyester film substrate.

EXAMPLE 4

100 parts of a 55% solid aqueous emulsion of a proprietary modified isooctylacrylate: acrylic acid copolymer, of the type disclosed in Ulrich U.S. Pat. No. Re. 24,906, was blended with 6 parts of "Microlite 126", unexpanded terpolymeric microspheres (average diameter about 7–15 micrometers) formed from poly(vinylidene chloride), acrylonitrile and a proprietary monomer, believed to be methylacrylate. The dispersion was coated using a knife orifice of 50 micrometers on 76-micrometer polyester film. The sample was allowed to air dry, after which microscopic examination showed that the microspheres were embedded in the layer of adhesive. The sample was then subjected to a temperature of 150° C., slightly above the recommended temperature of 140°–145° C. recommended for efficient expansion. Microscopic examination showed that the microspheres had expanded to an average diameter of about 30 micrometers. The adhesive composite was readily removable from bond paper after being rolled twice with a 2-kg roller.

EXAMPLE 5

100 parts of a 39% solids aqueous emulsion of a 95:5 isooctylacrylate:acrylic acid copolymer PSA and 2.2 parts "Miralite" 177 expanded polymeric microspheres were mixed together. When the dispersion was coated as described in Example 3 and dried (at a somewhat lower temperature since the microspheres had previously been expanded), a tape product was obtained in which the PSA contained 61% hollow microspheres by volume and the tape had an average initial peel adhesion of 41.9 g/cm when applied to polyester film. When the product was applied to bond paper, the force required to effect removal after 14 days was 37.4 g/cm width.

EXAMPLE 6

100 parts of a 20% solids solution of a 95.5:4.5 isooctylacrylate:acrylic acid copolymer in methyl isobutylketone was blended with 0.71 part "Miralite" 177 expanded polymer microspheres. The procedure of Example 4 was followed, except that the more dilute adhesive was coated at a thickness of 102 micrometers. After drying, the adhesive coating contained 50% hollow microspheres by volume. Initial peel adhesion to polyester film was 30.2 g/cm, and the force required to remove the product from bond paper after 14 days was 27.6 g/cm width.

EXAMPLE 7

40.9 parts of a 61.9% solids natural rubber latex ("Hartex" 103, available from Firestone Rubber Company), was mixed with 47.2 parts of a 55.7% solids aqueous dispersion of tackifier resin ("Foral" 85-55, available from Hercules, Inc.), 2.5 parts "Miralite" 177 polymeric microspheres, and 16.1 parts water were mixed together. Following the procedure of Example 5, the adhesive dispersion was coated on polyester film that had been primed with a 7.5% solids solution of 1:1 butadiene-acrylonitrile:butadiene-styrene rubber ("Hycar-GRS") in a 1:1 toluene:methyl ethyl ketone solvent blend, the dried adhesive containing 60% hollow microspheres by volume. The initial peel adhesion to polyester film was 44.7 g/cm width, and the force required to effect removal from bond paper after 14 days was 53.1 g/cm. In the absence of polymeric microspheres, the peel adhesion to polyester film was 127.6 g/cm width.

EXAMPLE 8

100 parts of a 42% solids aqueous dispersion of a 95:5 isooctylacrylate:acrylic acid copolymer was mixed with 3.5 parts of a 50% solids aqueous slurry of "Microlite" 101 unexpanded polymeric microbubbles. The adhesive was sprayed onto bond paper weighing 75 g/m$^2$ and dried at 100° C. to expand the microspheres, the dried adhesive containing 54% hollow microspheres by volume. Initial adhesion to polyester film was on the order of 25 g/cm width.

EXAMPLES 9–12

A series of adhesive dispersions was prepared by adding incremental amounts of "Miralite" 177 expanded polymeric microbubbles to separate 100-part aliquots of a 42% solid aqueous emulsion of a 95:5 isooctylacrylate:acrylic acid copolymer. The procedure of Example 5 was then followed except that a 0.5-mm coat of each adhesive was applied to a silicone-coated release liner ("Shiny 164", available from Daubert). The resultant products were transferable PSA coatings (i.e., transfer tapes) in which the peel adhesion of the upper (exposed) adhesive surface was lower than that of the adhesive surface in contact with the liner; the differential adhesion was attributable to the fact that, the exposed surface was more irregular, because of the presence of the microspheres. Results are tabulated below:

TABLE I

| Ex. | Parts "Miralite" 177 by weight | Percent Microspheres by volume | 90° Peel adhesion, upper surface, g/cm width | 90° Peel adhesion, lower surface, g/cm width |
| --- | --- | --- | --- | --- |
| 9 | 1.6 | 55 | 42.5 | 283 |
| 10 | 2.4 | 64 | 33.1 | 135 |
| 11 | 3.2 | 71 | 28.3 | 83.5 |
| 12 | 4.0 | 75 | 28.3 | 40.9 |

Several 3.8 cm×3.8 cm squares of the transfer tape of Example 9, carried on the release liner, were die-cut and evaluated further. The exposed surface of two of these squares was then adhered to the back of a sheet of easel paper, other pairs being similarly adhered to two other sheets of the same easel paper. The liners were then removed and the sheets adhered, respectively to a painted cinder block wall, a painted wall board surface, and a glass surface. After a dwell time of 35 days, the adhesive was readily removed from each of the substrates. With care, the adhesive squares on the back of the easel paper could be rolled up and removed. Substantially the same results can be obtained with much thicker adhesive coatings, e.g., 4 mm. Such products possess the unusual combination of low peel strength, much lower than for conventional homogeneous PSAs, but shear strength nearly equal to that of such adhesives. Thick adhesive layers of this type thus permit ready attachment to even irregular substrates while still affording easy removal.

EXAMPLE 13

The release liner was removed from each of two transfer tapes prepared as in Example 10 and the two newly exposed adhesive surfaces placed in contact with each other. The resultant product had twice the thickness of the Example 10 product but was somewhat more difficult to tear or dispense.

EXAMPLE 14

A product was prepared as in Example 13 except that a nonwoven web weighing 18.75 g/m² was sandwiched between the two adhesive surfaces. Handling, dimensional stability, and dispensability were all improved. If desired, a first homogeneous PSA may be applied to one face and a second homogeneous PSA, incompatible with the first (cf. U.S. Pat. No. 2,889,038) applied to the other face, resulting in a reinforced foam tape that can be wound convolutely directly on itself to form a roll and subsequently unwound. In a variation of Example 14, one of the two transfer tapes may be omitted and nonwoven fabric, scrim, etc., adhered only to the other transfer tape, resulting in a reinforced tape structure having adhesive on only one face.

EXAMPLES 15–20

A series of aqueous dispersions was formulated by adding incremental amounts of "Miralite" 177 expanded polymeric microspheres to separate 100 pbw aliquots of a 37% solids aqueous dispersion of 95:5 isooctylacrylate:acrylic acid copolymer. Each dispersion was then coated on a 75-micrometer polyester film backing, dried, and tested, obtaining the results summarized below:

TABLE II

| Example | Parts polymeric microspheres by weight | Percent microspheres by volume | Initial adhesion to polyester film, g/cm width | Initial adhesion to bond paper, g/cm width | Adhesion to bond paper after 14 days at 49° C., g/cm width | Initial room temperature shear holding power, kg/cm² |
| --- | --- | --- | --- | --- | --- | --- |
| 15 (Control) | 0 | 0 | 181 | Delaminated | Delaminated | 3.34 |
| 16 | 0.8 | 38 | 109 | 37.4 | 88.6 | 2.62 |
| 17 | 1.6 | 55 | 52.0 | 31.5 | 80.7 | 1.98 |
| 18 | 2.4 | 64 | 43.8 | 27.6 | 70.9 | 2.43 |
| 19 | 3.2 | 71 | 23.9 | 19.7 | 39.4 | 2.43 |
| 20 | 4.0 | 75 | 18.3 | 9.8 | 27.6 | 2.40 |

The foregoing examples show that peel adhesion is gradually deceased as the percent microspheres by volume is increased, while the shear holding power remains relatively constant.

EXAMPLES 21–24

A 91:9 isooctylacrylate:acrylic acid blend was partially thermally polymerized (8% conversion) to yield a syrup. To each of four 100 g aliquots of this syrup was added 0.08 g 1,6-hexanediol diacrylate (HDDA) crosslinker, 0.15 g 2,2-dimethoxy-2-phenyl acetophenone ("Irgacure" 651) photoinitiator, and 4.0 g hydrophobic fumed silica ("Aerosil" R-972). To the Example 21 aliquot, which serves as a control, was added 8.0 g glass microbubbles averaging 55 micrometers in diameter, having a specific gravity of 0.15. To each of the compositions of Examples 22, 23, and 24 was added 2.15 g of polymeric microspheres having, respectively, number average diameters of 12 micrometers ("Expancel" 551DE20), 23 micrometers ("Expancel" 551DE), and 50 micrometers ("Expancel" 461DE). Each sample was thoroughly mixed using a propeller stirrer, degassed in a desiccator, and polymerized between two silicone-coated polyester film liners, using 410 mJ/cm² of fluorescent black light to effect curing. In each case, the thickness of the cured adhesive layer was 800 micrometers, the hollow polymer microsphere content was 32.3% by volume, and the adhesive was a crosslinked acrylate PSA. A number of tests were then performed on each of the adhesives, with results as shown below:

TABLE III

| Test | Control 21 | Example 22 | Example 23 | Example 24 |
|---|---|---|---|---|
| Tensile strength, N/mm$^2$ | 0.81 | 1.16 | 1.16 | 1.18 |
| Elongation at break, % | 924 | 1,007 | 942 | 889 |
| T-Peel, N/cm | 25.6 | 28.0 | 29.1 | 28.3 |
| High temperature static shear (70° C., 1250 g wt), minutes to failure | 190 | 1,200 | 10,000+ | 10,000+ |

Several observations can be made with respect to the foregoing examples. Independent of the particle size, compared to the PSA filled with glass microbubbles, PSAs filled with polymeric microbubbles showed approximately 30% increase in tensile strength and 10-15% increase in internal strength. All three examples containing polymeric microspheres were significantly more resistant to high temperature static shear than the glass microbubble-filled adhesive tape.

When the tapes of Examples 21-24 were adhered to a steel panel painted with automotive enamel (Ford 50J107A) the force required to initiate and continue removal was measured after various lengths of time, with results as shown below:

TABLE IV

| | | Force required to initiate removal, N/cm, after dwell indicated | | | |
|---|---|---|---|---|---|
| Dwell time | Environmental conditions of dwell | Control 21 | Example 22 | Example 23 | Example 24 |
| 2 minutes | room temperature | 96.1 | 126.8 | 124.4 | 115.7 |
| 72 hours | room temperature | 133.9 | 163.8 | 162.2 | 133.1 |
| 72 hours | 38° C., 100% RH | 90.6 | 135.4 | 133.1 | 129.1 |

TABLE V

| | | Force to continue peel, N/cm width | | | |
|---|---|---|---|---|---|
| Dwell time | Environmental conditions of dwell | Control 21 | Example 22 | Example 23 | Example 24 |
| 2 minutes | room temperature | 13.4 | 15.7 | 18.9 | 17.3 |
| 72 hours | room temperature | 59.1 | 63.8 | 57.5 | 40.2 |
| 72 hours | 38° C., 100% RH | 48.0 | 51.2 | 52.8 | 59.1 |

In all tests conducted after a 2-minute dwell time, the adhesive popped off the painted panel; in all other tests, the adhesive split during removal. The superiority of the polymeric microsphere-filled adhesive to the glass microbubble-filled adhesives was apparent.

The products of control Example 21 and experimental Example 23 were then compared for their resistance to cold temperature. In the "cold slam test", where four specimens were mounted on a painted panel, two of control Example 21 specimens popped off during the first slam and the other two during the second; in contrast, the product of Example 23 showed no failures after ten slams.

The superiority of Example 23 product to commercial products containing glass microbubbles was also demonstrated under such extreme conditions as aging for 4 weeks at 90° C.; undergoing 4 complete cycles of 8 hours at −35° C., 16 hours at 38° C. and 100% relative humidity, and 8 hours at 70° C.; 7 days at 70° C. and 100% condensing humidity followed by 24 hours at −30° C. and 4 hours conditioning to room temperature.

EXAMPLES 25–27

A tackified rubber-resin adhesive was prepared by dissolving 21.3 parts 15:85 styrene:isoprene block copolymer ("Cariflex" 1107), 28.7 parts petroleum-based synthetic resin tackifier (available from Enjay Chemical Co. as "Escorez" 1310), 14.5 parts pinene palmyrate (available from Arizona Chemicals as "Zonarez" A-25) and 0.5 part octadecyl 3-(3,5-di-tert-butyl-4-hydroxyphenyl)propionate antioxidant (available from Ciba Geigy as "Irganox" 1076) in 35 parts of a 77:23 toluene:-heptane solvent. The adhesive was then divided into three aliquot parts, one of which was employed as a control, with no polymeric microspheres included, and the other two of which had different amounts of polymeric microspheres included. In each case, the adhesive was knife-coated on a silicone-treated paper backing, dried 5 minutes at room temperature, placed in a 70° C. forced air oven for 10 minutes, removed, and allowed to adjust to room temperature. Both surfaces of the control (Example 25) appeared smooth, as did the surfaces of Examples 26 and 27 that had been in contact with the liner; the exposed surfaces of the latter two adhesive layers, although relatively smooth, were less smooth than the surfaces that had been in contact with the liner. The 180° peel adhesion to each surface was then determined, the pertinent data being tabulated below:

TABLE VI

| Example | Parts "Expancel" DE/100 parts adhesive | Percent "Expancel" by volume | Dried thickness, micro-meters | Adhesion, N/cm Liner side | Adhesion, N/cm Exposed side |
|---|---|---|---|---|---|
| 25 (Control) | 0 | 0 | 75 | 15.0 | 13.8 |
| 26 | 0.7 | 36 | 59 | 10.2 | 8.7 |
| 27 | 1.5 | 48 | 64 | 8.7 | 7.1 |

The difference in peel adhesion values between the two surfaces depends to a considerable extent upon the viscosity of the adhesive. Adhesives having a lower viscosity than those of Examples 25–27 permit a greater migration of the bubbles to the exposed surface, thereby reducing the adhesive surface available for contacting a substrate and, as a result, reducing peel adhesion.

EXAMPLES 28–31

A 96:4 isooctyl acrylate:acrylamide copolymer, having an inherent viscosity of 0.85, was dissolved in a 40:60 ethyl acetate:heptane blend to form a 24% solids solution. To 100 pbw aliquots of this solution were added various amounts of "Expancel" DE hollow polymeric microspheres. The resultant compositions were coated on an silicone liner, dried, and tested as in Examples 25-27, with the following results:

TABLE VII

| Example | Parts "Expancel" DE/100 parts adhesive solids | Percent "Expancel" by volume | Dried Thickness, micrometers | Adhesion, N/cm Liner side | Adhesion, N/cm Exposed side |
|---|---|---|---|---|---|
| 28 (Control) | 0 | 0 | 58 | 6.2 | 3.7 |
| 29 | 2.1 | 46 | 92 | 4.6 | 2.9 |
| 30 | 4.2 | 58 | 124 | 4.0 | 1.0 |
| 31 | 6.3 | 68 | 173 | 2.3 | 0.8 |

EXAMPLES 32 and 33

6 parts of a solid 94:6 isooctyl acrylate:acrylic acid copolymer was dissolved in 91 parts of isooctyl acrylate monomer and 9 parts acrylic acid then added. To 100 parts of this syrup was added 0.17 part HDDA, 0.20 part "Irgacure" 651, 6.0 parts hydrophobic silica ("Aerosil" R-972), and 0.5 part polyacrylonitrile fibers having a diameter of 30 micrometers and a length of 4.0 mm (Drhm 6.7/4, available from Bayer). The adhesive dispersion was then divided into equal portions. To one portion was added 16.0% glass microspheres (control Example 32), and to the other portion was added a mixture of 8.0% glass microspheres and 2.0% "Expancel" 551DE expanded polymeric microspheres (Example 33). Each portion was thoroughly mixed with a propeller stirrer, degassed in a desiccator, and polymerized between two silicone-coated polyester film liners, using 440 mJ/cm$^2$ of fluorescent black light to effect curing. The thickness of each adhesive layer was 800 micrometers. The dried adhesive of control Example 32 contained 13.1% glass microspheres by weight, equivalent to 48.4% by volume. The dried adhesive of Example 33 contained, on a weight basis, 6.9% glass microspheres and 1.7% polymeric microspheres, corresponding respectively to 24.6% and 23.1% by volume. A number of tests were then performed to determine the physical characteristics of the two adhesives. Results are tabulated below:

TABLE VIII

| Test | Example 32 (control) | Example 33 |
|---|---|---|
| Tensile strength, N/mm$^2$ | 0.42 | 0.57 |
| Elongation at break, % | 167 | 246 |
| T-peel, N/cm width | 16.5 | 19.3 |
| Static shear, room temperature, 1250 g weight, stainless steel substrate, minutes | 120 | 10,000+ |
| Static shear, room temperature, 1500 g weight, stainless steel substrate, minutes | 100 | 10,000+ |
| Static shear, 40° C., 1250 g weight, stainless steel substrate, minutes | 1700 | 10,000+ |
| Static shear, 70° C., 1250 g weight, stainless steel substrate, minutes | 14 | 6000 |
| Static shear, room temperature, 1000 g weight, cellulose nitrate substrate, minutes | 500 | 10,000+ |

The foregoing data show that the tensile strength of the adhesive containing both glass microbubbles and hollow polymeric microspheres (Example 33) was approximately 25% greater than that of a comparable adhesive containing only glass microbubbles (control Example 32), and the T-peel tensile strength was approximately 15% greater. Shear adhesion of the product of Example 33, was far superior to that of control Example 32. The product of Example 33 was found to be useful for mounting mirrors on nitrocellulose lacquer surfaces.

EXAMPLES 34-38

An 89:6:5 isooctylacrylate:acrylic acid: (methacrylate-capped 10,000 MW polystyrene*) terpolymer PSA was prepared in 70:30 toluene:ethyl acetate solvent. The resultant 47% solids solution, having a viscosity of 8.6 Pa.s, was then divided into five equal portions. The control (control Example 34) was used as prepared, while to Examples 35, 36, 37, and 38 were added, respectively, 1.06%, 2.13%, 3.19% and 4.26% by weight of "Expancel" DE 551 hollow microspheres. Each of the compositions was coated on a silicone liner, dried for 5 minutes at room temperature and 10 minutes at 70° C. and then evaluated. Results are tabulated below:
*Commonly referred to as a "macromer", available from Arco.

TABLE IX

| | | Control 34 | Example 35 | Example 36 | Example 37 | Example 38 |
|---|---|---|---|---|---|---|
| "Expancel" (weight %) | | 0.00 | 1.06 | 2.13 | 3.19 | 4.26 |
| (volume %) | | 0.00 | 35.00 | 45.50 | 52.50 | 57.50 |
| Thickness, mm | | 0.21 | 0.24 | 0.35 | 0.29 | 0.307 |
| Coating weight, g/m$^2$ | | 216 | 191 | 175 | 162 | 150 |
| Viscosity, Pa.s (Brookfield Spindle 7, 20 rpm) | | — | 4 | 16 | 24 | 35.6 | 51.6 |
| 180° Peel Adhesion, N/cm | | | | | | |
| Initial | Top side | 6.26 | 4.99 | 3.97* | 3.63* | 3.80* |
| | Liner side | 6.64 | 6.37 | 2.17 | 3.14 | 3.04 |
| 24 Hrs RT | Top side | 10.40 | 10.23 | 8.37 | 7.46 | 3.04 |
| | Liner side | 8.32 | 7.93 | 4.72 | 5.87 | 6.99 |
| 48 Hrs RT | Top side | 12.65 | 12.85 | 10.31 | 13.63* | 13.02* |
| | Liner side | 9.63 | 8.96 | 5.25 | 7.23 | 7.28 |

TABLE IX-continued

| | Example | | | | |
|---|---|---|---|---|---|
| | Control 34 | 35 | 36 | 37 | 38 |
| Liner release, cN/cm | 6.38 | 4.13 | 3.31 | 2.28 | 2.68 |
| Static Shear, 250 g weight, minutes | | | | | |
| Room Temperature | 1210 | 1444 | 1312 | 502 | 765 |
| 70° C. | 34 | 26 | 12 | 18 | 17 |

*Adhesive split

EXAMPLES 39 AND 40

A 28% solids solution of 91:9 isooctyl acrylate:N-vinylpyrrolidone copolymer, having an inherent viscosity of 1.49 was prepared in 40:60 ethyl acetate:heptane and divided into two equal portions. One portion (control Example 39) was used as prepared. To the other portion (Example 40) was added 2.5% by weight "Expancel" DE hollow microspheres. Each of the two compositions was then coated on a silicone liner, dried, and evaluated. Results are tabulated below:

TABLE X

| Example | Parts "Expancel" DE/100 parts adhesive | Percent "Expancel" by volume | Dried thickness, micrometers | Adhesion, N/cm | |
|---|---|---|---|---|---|
| | | | | Liner side | Exposed side |
| 39 (Control) | 0 | 0 | 90 | 6.4 | 4.4 |
| 40 | 2.5 | 48 | 136 | 4.8 | 2.4 |

EXAMPLES 41 AND 42

An 87.5:12.5 isooctylacrylate:acrylic acid monomer blend was partially thermally polymerized (8% conversion) to yield a syrup. To each of two 100 g aliquots of this syrup was added 0.055 g 1,6-hexanediol diacrylate (HDDA) crosslinking agent, 0.19 g 2,2-dimethoxy-2-phenyl acetophenone ("Irgacure" 651) initiator, and 2.0 g hydrophilic silica ("Aerosil" 200). To the Example 41 aliquot was added 8.0 grams 3M "Scotchlite" C15/250 glass bubbles, and to the Example 42 aliquot was added 2.15 g "Expancel" 551DE polymeric microspheres, the density of the resultant adhesive in each case being approximately 0.75 g/cc. Each aliquot was thoroughly mixed using a propeller stirrer, degassed in a desiccator, and polymerized between two silicone-coated polyester film release liners, using 410 mJ/cm$^2$ of fluorescent black light to effect curing. In each case the thickness of the cured adhesive layer was 800 micrometers. The two adhesive layers displayed the following physical characteristics:

TABLE XI

| | Example | |
|---|---|---|
| Physical Characteristic | Control 41 | 42 |
| Tensile strength, N/mm$^2$ | 1.09 | 1.69 |
| Elongation at break, % | 775 | 820 |
| T-peel, N/cm | 30.5 | 35.5 |

Over each side of one portion of each adhesive layer (hereinafter designated "A") was then laminated a 50-micrometer thick solvent-polymerized 90:10 isooctylacrylate:acrylic acid PSA, crosslinked with a bisaziridine. In the same manner, to each side of another portion of each adhesive layer (hereinafter designated "B") was laminated a 50-micrometer thick solvent-polymerized 57.5:35.0:7.5 isooctylacrylate:methylacrylate:acrylic acid PSA, crosslinked with a bisaziridine.

Each of the four adhesive products was then adhered to a steel panel painted with automotive enamel (Ford 50J107A), and the force required to initiate and continue removal was measured after various lengths of time at different environmental conditions with the results shown below:

TABLE XII

| | | Force required to initiate removal, N/cm, after dwell time indicated | | | |
|---|---|---|---|---|---|
| | | Example | | | |
| Dwell time | Environmental conditions of dwell | Control 41A | 42A | Control 41B | 42B |
| 2 minutes | Room temperature | 81 | 93 | 113 | 121 |
| 72 hours | Room temperature | 145 | 150 | 146 | 159 |
| 72 hours | 38° C., 100% RH | 113 | 124 | 125 | 143 |

TABLE XIII

| | | Force to continue peel, N/cm width | | | |
|---|---|---|---|---|---|
| | | Example | | | |
| Dwell time | Environmental conditions of dwell | Control 41A | 42A | Control 41B | 42B |
| 2 minutes | Room temperature | 39 | 42 | 46 | 54 |
| 72 hours | Room temperature | 71 | 71 | 69 | 94 |
| 72 hours | 38° C., 100% RH | 55 | 70 | 59 | 71 |

In all tests conducted after 2 minutes dwell time, the adhesive popped off the painted panel; in all other tests, the adhesive layer split during removal.

EXAMPLES 43 AND 44

A 91:9 isooctylacrylate:acrylic acid monomer blend was partially thermally polymerized (11% conversion) to yield a syrup. To each of two 100 g aliquots of this syrup was added 0.05 g 1,6-hexanediol diacrylate (HDDA), 0.15 g 2,2-dimethoxy-2-phenyl acetophenone ("Irgacure" 651) initiator, and 4 g fumed silica. To the first aliquot (Example 43) was added 2 g glass microspheres and 1.5 g "Expancel" DE 551 expanded polymeric microspheres; to the second aliquot (Example 44) was added 6 g glass microspheres and 0.5 g "Expancel" 551 microspheres. Each sample was thoroughly mixed, using a propeller stirrer, degassed in a desiccator, and polymerized between two silicone-coated polyester film liners using 2,369 mJ/cm$^2$ of fluorescent black light to effect curing. In each case the resultant product was a 3,500-micrometer layer of a crosslinked acrylate PSA containing 45% microspheres by volume and useful for glazing, e.g., mounting windshields in automobiles.

EXAMPLES 45-48

A 91:9 isooctylacrylate:acrylic acid blend was partially thermally polymerized (14% conversion) to yield a syrup. To each of four 100 g aliquots of this syrup was added 0.05 g 1,6-hexanediol diacrylate (HDDA), 0.15 g 2,2-dimethoxy-2-phenyl acetophenone ("Irgacure" 651) initiator, 4 g fumed silica ("Aerosil" R-972), and 2.15 g expanded polymeric microspheres ("Expancel" DE 551). To the four aliquots were then added varying weights of unexpanded polymeric microspheres ("Expancel" DU). Each aliquot was thoroughly mixed using a propeller stirrer, degassed in a desiccator, and polymerized between two silicone-coated polyester film liners using 386 mJ/cm² of fluorescent black light to effect curing. A number of tests were then performed on each of the adhesive layers, with the results shown below:

TABLE XIV

| Test | Example | | | |
|---|---|---|---|---|
| | 45 | 46 | 47 | 48 |
| Weight % "Expancel" DU added | 0 | 1 | 2 | 3 |
| Thickness, micrometers | 900 | 900 | 900 | 890 |
| Tensile strength, N/mm² | 1.15 | 1.26 | 1.25 | 1.20 |
| Elongation at break, % | 656 | 727 | 732 | 718 |
| Static shear, 1 kg weight, 70° C., min. | 10,000+ | 10,000+ | 10,000+ | 10,000+ |

Samples of each adhesive layer were laminated to (1) steel panels painted with automotive enamel and (2) stainless steel panels and allowed to dwell for 72 hours at room temperature. The 180° peel adhesion test was then used to measure the force required to initiate removal of the adhesive strip, as well as the force required to continue removal. Identical panels, each bearing its respective adhesive layer, were allowed to dwell for 72 hours at room temperature and then placed in a 120° C. oven for five minutes to expand the "Expancel" DU microspheres, after which the same tests were conducted. Results are tabulated below:

TABLE XV

| Test | Example | | | |
|---|---|---|---|---|
| | 45 | 46 | 47 | 48 |
| Adhesive thickness, micrometers | 900 | 940 | 970 | 1000 |
| Total volume % microspheres | 40 | 50 | 53 | 57 |

TABLE XV-continued

| Test | Example | | | |
|---|---|---|---|---|
| | 45 | 46 | 47 | 48 |
| Peel adhesion to automotive enamel, N/cm width | | | | |
| To initiate removal | | | | |
| Before heating | 104 | 104 | 112 | 98 |
| After heating | 54 | 65 | 85 | 65 |
| To continue removal | | | | |
| Before heating | 19.8 | 20.0 | 23.0 | 21.0 |
| After heating | 14.5 | 20.3 | 15.6 | 9.8 |
| Peel adhesion to stainless steel, N/cm width | | | | |
| Before heating | 12.6 | 13.4 | 13.0 | 12.2 |
| After heating | 32.3 | 29.9 | 31.1 | 31.1 |

It is interesting to note that expansion of the microspheres appears to decrease the adhesion to automotive enamel but increase the adhesion to stainless steel.

EXAMPLES 49-55

An 87.5:12.5 isooctyl acrylate:acrylic acid monomer blend containing 0.04 part per hundred 2,2-dimethoxy-2-phenyl acetophenone ("Irgacure" 651) was photopolymerized (8% conversion) to yield a syrup. To each of ten 250 g aliquots of this syrup was added to 0.25 g "Irgacure" 651, 0.125 g 1,6-hexanediol diacrylate (HDDA) crosslinker, 10.0 g "Aerosil" R-972 fumed silica and the amount of polymeric microspheres specified in table XVI. Each aliquot was thoroughly mixed with a propeller stirrer, degassed in a desiccator, repurged with nitrogen, and polymerized between two silicone-coated polyester release liners, using 450 mJ/cm² of fluorescent black light to achieve cure. The samples were 1.0-1.09 mm thick. Tensile properties as reported in Table XVI were then obtained.

Acrylate-based PSAs were laminated to both sides of this core, and peel adhesion tests conducted using a low solids lacquer paint substrate. Results are also included in Table XVI.

TABLE XVI

| Ex. | Expancel 551 DE (wt. %) | "Expancel" 551 DE (Percent by Vol.) | Density (g/cm³) | Peak Tensile Stress (N/mm²) | Elongation at Break (Percent) | Energy to Break (cm-N) | T-Peel (N/cm) | 90° Peel Adhesion (N/cm) | 180° Peel Adhesion (N/cm) |
|---|---|---|---|---|---|---|---|---|---|
| 49 | 0 | 0 | 1.03 | 1.05 | 901 | 127 | 45.3 | 48.8 | 35.7 |
| 50 | 0.93 | 20 | 0.88 | 1.28 | 860 | 191 | 54.9 | 54.7 | 37.2 |
| 51 | 1.59 | 30 | 0.78 | 1.42 | 876 | 240 | 44.4 | 59.8 | 39.4 |
| 52 | 2.44 | 40 | 0.69 | 1.37 | 776 | 233 | 41.6 | 85.8 | 42.3 |
| 53 | 3.62 | 50 | 0.58 | 1.23 | 606 | 180 | 39.2 | 77.1 | 42.9 |
| 54 | 5.34 | 60 | 0.48 | 1.03 | 321 | 85.4 | 30.2 | 59.3 | 43.1 |
| 55 | 8.07 | 70 | 0.35 | 0.64 | 169 | 32.5 | 10.5 | 19.9 | 16.9 |

EXAMPLES 56, 57

A 91:9 (Example 56) and a 93:7 (Example 57) isooctylacrylate:acrylic acid blend were partially thermally polymerized (8% conversion) to yield syrups. To 100 g of each syrup 0.11 g 1,6-hexanediol diacrylate (HDDA) crosslinker and 0.20 g 2,2-dimethoxy-2-phenyl acetophenone ("Irgacure" 651) photoinitiator was added.

To the syrup of Example 56 was then added 2.15 g (32.3% by volume) expanded polymeric microspheres ("Expancel" 551 DE) and 4.00 g hydrophobic fumed silica ("Aerosil" R-972), to the syrup of Example 57 2.50 g (35.6% by volume) polymeric microspheres and 6.00 g hydrophobic fumed silica were added.

The filled syrup of each example was thoroughly mixed using a propeller stirrer, degassed in a desiccator and polymerized between two silicone coated polyester film liners using 410 mJ/cm$^2$ of fluorescent black light to effect curing. In the first ⅔% of the curing chamber for Example 56 relatively low intensity light and for Example 57 relatively high intensity light was used.

In each case the thickness of the cured crosslinked acrylate PSA layer was 800 micrometers. A number of tests were then performed on each of the adhesives with results as shown below:

TABLE XVII

| | Example | |
|---|---|---|
| | 56 | 57 |
| Foam density, kg/m$^3$ | 730 | 710 |
| Tensile strength, N/mm$^2$ | 1.37 | 1.06 |
| Secant modulus, N/mm$^2$ | | |
| 20% | 0.80 | 0.70 |
| 100% | 0.32 | 0.26 |
| Elongation at break, % | 771 | 914 |
| T-peel tensile strength, N/cm | 32.0 | 31.0 |
| High temperature static shear (70° C., 1000 g wt), minutes to failure | 10,000+ | 10,000+ |

TABLE XVIII

| 90° Peel Adhesion to Stainless Steel, n/cm width | | | |
|---|---|---|---|
| Dwell Time | Environmental conditions of dwell | Examples 56 | 57 |
| 2 minutes | room temperature | 12.9 | 11.1 |
| 20 minutes | room temperature | 17.1 | 14.2 |
| 3 days | room temperature | 25.6 | 27.5 |

When the tapes of Examples 56 and 57 were adhered to a steel panel painted with automotive paint (Opel, VW) the force required to initiate and continue removal of an attached vinyl bar was measured, with results as shown below:

TABLE XIX

| Dwell time | Environmental conditions of dwell | Paint | Force to initiate removal, N/cm Ex. 56 | Ex. 57 | Force to continue peel, N/cm Ex. 56 | Ex. 57 |
|---|---|---|---|---|---|---|
| 72 hrs. | room temp. | Opel | 111.3 | 95.2 | 27.9 | 20.4 |
| 72 hrs. | room temp. | VW | 112.6 | 85.4 | 29.6 | 19.4 |

EXAMPLES 58–63

A 91:9 and an 87.5:12.5 isooctyl acrylate:acrylic acid blend were both partially thermally polymerized (8% conversion) to yield syrups. To each of three 100 g samples of each syrup were added 0.20 g 1.6-hexanediol diacrylate (HDDA) crosslinker, 0.20 g 2,2-dimethoxy-2-phenyl acetophenone ("Irgacure" 651) photoinitiator and 6.00 g hydrophobic fumed silica ("Aerosil" R-972). Polymeric microspheres ("Expancel" 551 DE) were then added. Each sample was thoroughly mixed using a propeller stirrer, degassed in a desiccator and polymerized between two silicone-coated polyester film liners, using 509 mJ/cm$^2$ of fluorescent black light to effect curing.

In each case the thickness of the cured crosslinked acrylate PSA layer was 800 micrometers.

A number of tests were then performed on each of the adhesives with results as shown below:

TABLE XX

| Example | 58 | 59 | 60 | 61 | 62 | 63 |
|---|---|---|---|---|---|---|
| Isooctylacrylate: Acrylic Acid Ratio | 91:9 | 91:9 | 91:9 | 87.5: 12.5 | 87.5: 12.5 | 87.5: 12.5 |
| "Expancel" 551 DE | | | | | | |
| weight, g | 2.15 | 3.50 | 5.00 | 2.15 | 3.50 | 5.00 |
| Volume % | 32.1 | 43.5 | 52.3 | 32.1 | 43.5 | 52.3 |
| Foam Density, kg/m$^3$ | 760 | 640 | 530 | 750 | 640 | 550 |
| Tensile Strength, N/mm$^2$ | 1.41 | 1.13 | 1.05 | 1.71 | 1.54 | 1.34 |
| Secant Modulus, N/mm$^2$ | | | | | | |
| 20% | 0.85 | 1.20 | 1.70 | 1.40 | 1.70 | 2.30 |
| 100% | 0.35 | 0.49 | 0.59 | 0.58 | 0.70 | 0.84 |
| Elongation at break, % | 695 | 407 | 375 | 585 | 536 | 381 |
| T-peel tensile, N/cm | 31.0 | 30.3 | 25.8 | 41.8 | 35.3 | 27.8 |
| 90° Peel Adhesion, N/cm | | | | | | |
| Substrate Dwell Time | | | | | | |
| Stainless Steel | | | | | | |
| 2 minutes | 12.3 | 12.2 | 11.6 | 11.0 | 12.7 | 10.6 |
| 20 minutes | 16.8 | 16.3 | 14.6 | 19.8 | 21.5 | 20.2 |
| 3 days | 29.9 | 26.9 | 32.1* | 53.2 | 54.6 | 41.7* |
| Polyproplyene | | | | | | |
| 2 minutes | 2.1 | 1.7 | 1.9 | 0.8 | 0.9 | 0.9 |
| 20 minutes | 4.7 | 3.2 | 2.7 | 1.4 | 1.6 | 1.0 |
| 3 days | 4.2 | 2.3 | 3.3 | 1.5 | 1.2 | 1.1 |

*Foam split (all others popped off panel)

EXAMPLES 64, 65

A 91:9 isooctylacrylate:acrylic acid blend was partially thermally polymerized (6.5% conversion) to yield a syrup. To two 100 g samples of this syrup 0.18 g 1,6-hexanediol diacrylate (HDDA) crosslinker, 0.20 g 2,2-dimethyoxy-2-phenyl acetophenone ("Irgacure" 651) photoinitiator, 6.00 g hydrophobic fumed silica "Aerosil" R-972 and 0.5 g polyacrylonitrile fibers having a diameter of 30 micrometers and a length of 4.0 mm (Dralon Drhm 6.7/4, available from Bayer) were added. To the blend of Example 64, 8.00 g glass microspheres and 1.75 g "Expancel" 551 DE expanded polymeric microspheres were added; to the blend of Example 65, only 3.75 g "Expancel" 551DE was added. Each sample was thoroughly mixed using a propeller stirrer, degassed in a desiccator and polymerized between two silicon coated polyester film liners using 300 mJ/cm$^2$ of fluorescent black light to effect curing. In each case the thickness of the cured crosslinked acrylate PSA layer was 800 micrometers.

TABLE XXI

| | Example | |
|---|---|---|
| | 64 | 65 |
| Vol. % glass microspheres | 25.3 | |
| Vol. % polymeric microspheres | 20.8 | 45.2 |
| Total Vol. % microspheres | 46.1 | 45.2 |
| Foam density, kg/m$^3$ | 590 | 620 |
| T-peel tensile strength N/cm width | 24.9 | 27.5 |

TABLE XXI-continued

| | Example | |
|---|---|---|
| | 64 | 65 |
| Tensile strength, N/mm² | 0.81 | 0.59 |
| Secant modulus, 20%, N/mm² | 0.61 | 0.59 |
| Elongation % | 108 | 233 |
| 90° peel adhesion to stainless steel, N/cm | | |
| 2 minutes dwell | 14.0 | 11.8 |
| 20 minutes dwell | 26.0 | 19.0 |

EXAMPLES 66-68

A 91:9 isooctylacrylate:acrylic acid monomer blend was partially U.V. polymerized (8% conversion) to yield a syrup. To each of three 100 g aliquots of this syrup was added 0.08 g 1,6-hexanediol diacrylate (HDDA) crosslinking agent, 0.14 g 2,2-dimethoxy-2-phenyl acetophenone ("Irgacure" 651) initiator, and 6.0 g hydrophobic silica ("Aerosil" 972). To each Example was added 2.15 g "Expancel" 551DE polymeric microspheres, the density of the resultant adhesive in each case being approximately 0.75 g/cc. Each aliquot was thoroughly mixed using a propeller stirrer and degassed in a desiccator. Two of the three microbubble-filled mixture (Examples 70 and 71) were frothed as taught in "Typical Tape-Making Procedure" of U.S. Pat. No. 4,415,616.

TABLE XXII

| | Example | | |
|---|---|---|---|
| | 66 | 67 | 68 |
| Tensile Strength, N/mm² | 1.42 | 0.82 | 0.74 |
| Elongation at break, % | 860 | 884 | 762 |
| T-peel, N/cm | 36.5 | 12.7 | 11.6 |
| Density, g/cm³ | 0.74 | 0.69 | 0.64 |

Each of the three adhesive products were adhered to a steel panel painted with automotive enamel (Ford 50J107A), and the force required to initiate and continue removal was measured after various lengths of time at different environmental conditions, with the results shown below:

TABLE XXIII

| Dwell time | Environmental Conditions of Dwell | Force Required to Initiate Removal, N/cm Example | | | Force Required to Continue Removal, N/cm | | |
|---|---|---|---|---|---|---|---|
| | | 66 | 67 | 68 | 66 | 67 | 68 |
| 2 min. | Room temp. | 57 | 40 | 43 | 14 | 12 | 12 |
| 72 hrs. | Room temp. | 103 | 88 | 84 | 31 | 24 | 25 |
| 72 hrs. | 38° C., 100% RH | 128 | 87 | 89 | 46 | 39 | 39 |

In all tests conducted after 2 minutes dwell time, the adhesive popped off the painted panel; in all other tests, the adhesive layer split during removal.

We claim:

1. Pressure-sensitive adhesive-coated sheet material comprising in combination a sheet backing bearing on at least one surface a layer of normally tacky and pressure-sensitive adhesive on the order of at least 20 micrometers thick, said layer containing from about 1/5 to about 2/3% by volume of resilient non-tacky hollow thermoplastic polymeric spheres having a diameter in the approximate range of 10-125 micrometers, substantially all of said spheres having an actual density on the order of 0.01-0.04 g/cc and a shell thickness on the order of 0.02 micrometers and being substantially completely surrounded by the pressure-sensitive adhesive.

2. The sheet material of claim 1 wherein at least about 2/3 of said spheres have a diameter in the range of 30-70 micrometers.

3. The sheet material of claim 2 wherein the layer of normally tacky and pressure sensitive is on the order of 20-4000 micrometers thick.

4. The sheet material of claim 2 wherein the hollow polymeric spheres are formed of vinylidene chloride-acrylonitrile copolymer, the adhesive layer containing about 1/5 to about ½ polymeric spheres on a volume basis and being capable of substantially complete recovery after being subjected to a temporary compressive pressure of 15 kPa, said adhesive maintaining good adhesion to substrate even when subjected to mechanical shock at extremely low temperatures.

5. The sheet material of claim 1 wherein the hollow polymeric spheres are formed of vinylidene chloride-acrylonitrile copolymer.

6. The sheet material of claim 5 wherein the adhesive layer is permanently bonded to the backing.

7. The sheet material of claim 6 wherein the thickness of the adhesive layer is on the order of 40-80 micrometers and contains at least 50% of the hollow polymeric spheres on a volume basis, said adhesive layer being capable of substantially complete recovery after being subjected to a temporary compressive pressure of 15 kPa, and the exposed surface of the adhesive layer having an irregular contour caused by the presence of the hollow polymeric spheres, whereby said sheet material can be repeatedly adhered to paper substrates and removed without tearing the paper, a sheet of material identical except that the exposed surface of the adhesive is substantially planar, not being removable from paper substrates, after being applied thereto, without tearing the paper.

8. The sheet material of claim 5 wherein the adhesive layer is strippably bonded to the backing.

9. The sheet material of claim 8 wherein the exposed surface of the adhesive layer has an irregular contour caused by the presence of the hollow polymeric spheres, the surface of the adhesive layer in contact with the sheet backing being smooth and uniform, whereby said sheet material can be removed from the backing to provide a transfer tape having lower adhesive properties at the initially exposed surface than at the surface initially in contact with the backing.

10. The sheet material of claim 8 wherein the adhesive layer is on the order of one millimeter thick and one surface thereof is strippably bonded to a smooth-surfaced backing, yielding a foam tape especially suited for mounting applications that will be exposed to low temperatures.

11. The sheet material of claim 8 wherein the adhesive layer is on the order of 3-4 millimeters thick and is especially adapted to glazing.

12. The sheet material of claim 8 wherein glass microspheres are also present in the adhesive layer.

13. The sheet material of claim 8 wherein gas-filled voids are also present in the adhesive layer.

14. The sheet material of claim 5 wherein the pressure-sensitive adhesive is a copolymer of isooctyl acrylate and at least one other monoethylenically unsaturated monomer.

15. The sheet material of claim 14 wherein the other monomer is acrylic acid.

16. The sheet material of claim 14 wherein the adhesive contains UV initiator.

17. The sheet material of claim 14 wherein the other monomer is acrylamide.

18. The sheet material of claim 14 wherein one of the other monomers is N-vinyl pyrrolidone.

19. The sheet material of claim 14 wherein a tackifier is also included.

20. The sheet material of claim 14 wherein the adhesive is an isooctylacrylate:acrylic acid:macromer terpolymer, the macromer being methacrylate-capped polystyrene.

21. The sheet material of claim 5 wherein the pressure-sensitive adhesive is a rubber-resin composition.

22. The sheet material of claim 21 wherein the adhesive layer contains at least about ⅛ hollow spheres by volume.

23. The sheet material of claim 5 wherein a layer of essentially void-free normally tacky and pressure-sensitive adhesive is laminated to at least one face of the microsphere-filled adhesive layer.

24. The sheet material of claim 5 wherein a layer of normally tacky and pressure-sensitive adhesive is adhered to the opposite surface of the backing.

* * * * *

UNITED STATES PATENT AND TRADEMARK OFFICE
CERTIFICATE OF CORRECTION

PATENT NO. : 4,855,170
DATED : August 8, 1989
INVENTOR(S) : Darvell et al

It is certified that error appears in the above-identified patent and that said Letters Patent is hereby corrected as shown below:

Col. 2, line 4, "3,864,161" should be -- 3,864,181 --

Col. 3, line 2, "is" should be -- in --

Col. 4, line 9, "substantially" should be -- subsequently --

Col. 8, line 49, after "50mm" delete "33" and insert -- x --

Col. 25, claim 1, line 67, after "2/3" delete -- % --

Col. 8, line 49, "50mm" should be --50-mm--.

Signed and Sealed this

Fourth Day of June, 1991

Attest:

HARRY F. MANBECK, JR.

Attesting Officer

Commissioner of Patents and Trademarks